March 6, 1951 — H. Z. MARTIN — 2,543,863
FLUIDIZED CATALYST REGENERATION PROCESS
Filed June 15, 1944 — 3 Sheets-Sheet 1

Homer Z. Martin  Inventor
By  Attorney

Patented Mar. 6, 1951

2,543,863

UNITED STATES PATENT OFFICE 2,543,863

FLUIDIZED CATALYST REGENERATION PROCESS

Homer Z. Martin, Roselle, N. J., assignor to Standard Oil Development Company, a corporation of Delaware Application June 15, 1944, Serial No. 540,519

3 Claims. (Cl. 252—417)

This invention relates to catalyst recovery, and more particularly, to the removal of powdered catalyst from gas streams. This invention, while primarily directed to the removal of catalyst from regeneration gases from hydrocarbon conversion processes, is applicable to any process in which it is desired to remove the last traces of finely divided solids from a gaseous stream.

Many hydrocarbon conversion processes, such as catalytic cracking, catalytic reforming, catalytic isomerization, and the like, use powdered catalyst which is suspended in hydrocarbon vapors, passed to a reaction zone at high temperatures, and then separated from the hydrocarbon vapors, regenerated and returned to the contacting step. In such processes considerable difficulty has been experienced in removing fine particles of catalyst, particularly from the hot regeneration gases. Any catalyst which is not removed from these gases is for the most part entirely lost and the economic efficiency of the process is reduced in consequence. It is usual to employ electrical precipitation for the recovery of these catalyst fines from regeneration gases but this system is expensive and objectionable for many reasons.

It has also been proposed to recover the catalyst fines by scrubbing the exit gases from the regenerator with water, settling the resulting slurry to give a concentrated slurry and introducing this concentrated slurry into the regenerator where the water aids in controlling the temperature in the regenerator. It has been found, however, that the addition of the large quantities of water which are present even in the concentrated slurry limits the capacity of a fluid catalyst system. One of the limitations of a fluid catalyst unit has been the difficulty of heating large volumes of oil. In several designs, for example, all preheat to the oil is obtained by heat exchange with fractionator or catalytic cracker streams so that any use of the heat in these systems for other purposes simply decreases the extent to which oil can be preheated. It may be stated that the heat liberation in the catalytic section of the fluid cracking plant is a function primarily of the size of the air compressor and attendant regeneration and catalyst recovery equipment; that is true, since the heat liberated by combustion involving a pound of air varies only slightly as the nature of the combustible hydrocarbon is changed. In certain commercial plants, the size of the air compressor is such that plant capacity is limited to about 15,000 barrels per day due to the impossibility of heating more than this quantity of oil to cracking temperature. In such a plant the catalyst loss from the regenerator even with one stage of cyclones is about 100 tons per day and the resulting quantity of water from a settler at the rate of five lbs. of catalyst per gallon of water is about 14,000 lbs. per hr. The heat load in the regenerator required to heat and vaporize this amount of water is about 16 to 18 million B. t. u. per hour. Hence the addition of such an amount of water to the regenerator would materially limit the capacity of the plant.

It is therefore an object of this invention to provide a new and improved method and means for recovering catalyst fines from regeneration gases without adding an unduly large quantity of water to the regenerator.

According to this invention, the powdered catalyst is removed substantially completely from the regeneration gases by the usual cyclone separator. The effluent gases from the cyclone containing the catalyst fines are then passed to a suitable scrubbing tower such as a spray chamber or packed tower, or other contacting equipment where they are passed in countercurrent flow to water to wash or scrub out the remaining powdered catalyst fines in the gases. The aqueous slurry containing the catalyst in suspension is withdrawn from the scrubbing tower and passed to a separating zone where all or the bulk of the water is removed from the catalyst slurry. The substantially dry catalyst is then introduced into the regenerator where the heat of regeneration serves to flash any residual water remaining in the catalyst; alternatively a separate heating zone may be used for drying the catalyst suspension.

The invention will now be described in connection with the attached drawings in which.

Figure 1:
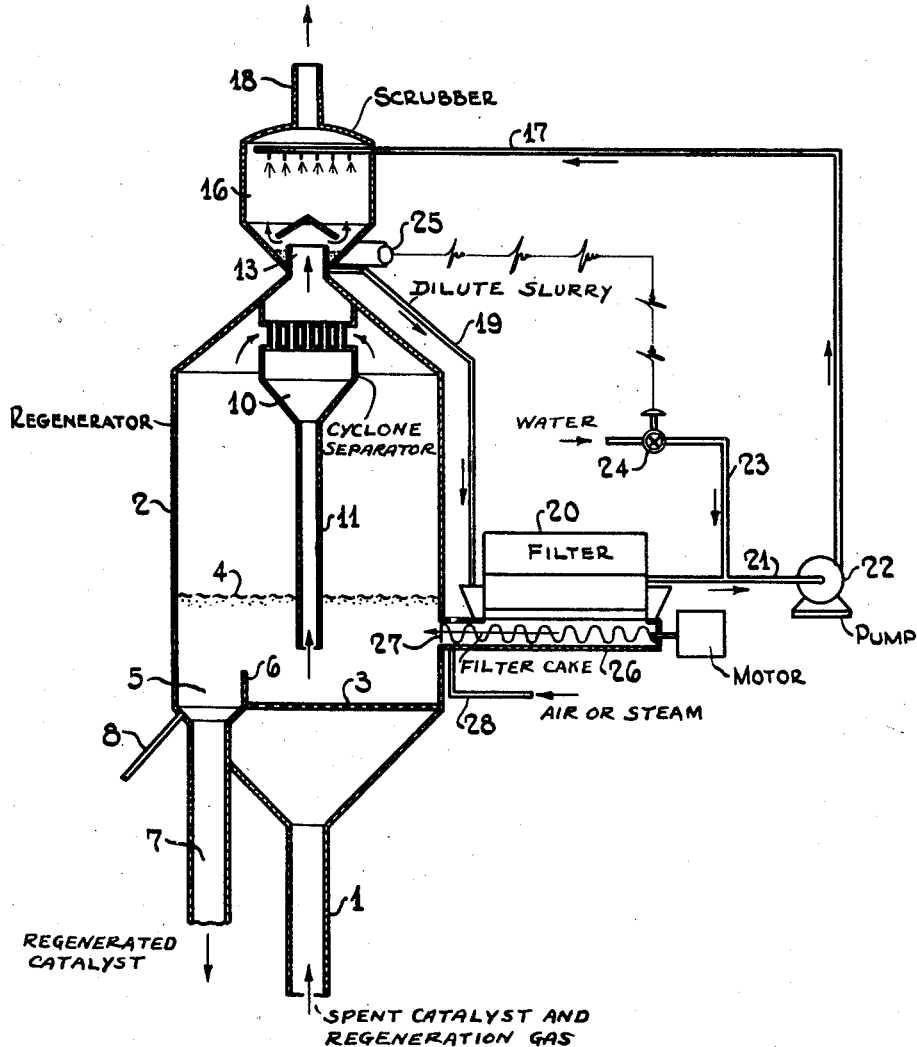
Fig. 1 is a diagrammatic view of one embodiment of the invention in which the catalyst water slurry is filtered to obtain a substantially dry cake which is introduced into the regenerator.

Referring now to Fig. 1, a mixture of spent catalyst and a regenerating gas, such as air or other gaseous oxidizing agent, is introduced through line 1 into the bottom portion of a regeneration zone 2 and below a grid 3 arranged in the bottom portion of the regeneration zone. The velocity of the gases in the regeneration zone is such that the body of catalyst or solid particles in the regeneration zone is maintained as a relatively dense fluidized mass having a level 4. The density of the catalyst below this level is about 10 to 30 lbs. per cu. ft. The space above level 4 has a much lower concentration of catalyst or contact particles than the dense fluidized mass having the level 4. In this regeneration zone, the catalyst or contact particles are maintained in a turbulent condition so that intimate contact is provided between the catalyst and the regeneration gas. Due to this turbulent condition, the temperature throughout the mass undergoing regeneration is substantially uniform, preferably below about 1150° F.

Within the bottom portion of the regeneration zone 2 is a well or reservoir 5 which extends above the grid 3 for a short distance as indicated by reference character 6. The top of the well 6 may be desirably located anywhere within the dense catalyst phase. Regenerated catalyst or contact particles are withdrawn as a relatively dense fluidized mass from the bottom portion of the regeneration zone 2 through line 7. Stripping gas, such as inert gas or steam, is introduced into the bottom portion of the well 5 through line 8. This stripping gas is used to remove any regenerating gas remaining in the regenerated catalyst. Most of the regenerated catalyst or contact material is withdrawn from the bottom of the regeneration zone 2 through well 5 and line 7 in a relatively dense condition. However, some of the catalyst or contact particles pass overhead with the regeneration gases, and in order to remove these catalyst particles, the suspension is passed through a separating means 10 which is shown in the drawing as a cyclone separator located within the regeneration zone but other separating means may be used as desired. The separated catalyst is returned to the well or reservoir 5 in the regeneration zone 2 through line 11.

The separated regeneration gases pass overhead through line 13. These gases passing out through line 13 still contain some relatively fine catalyst particles which cannot be removed in a centrifugal separator, such as a cyclone separator. In order to separate additional amounts of catalyst or contact particles, the regeneration gases in line 13 are introduced into the bottom of scrubber 16. In this scrubber 16 the gases containing the catalyst fines are scrubbed with water introduced at the top of the scrubber through line 17. The water scrubs out practically all of the fine particles contained in the gas. The scrubbed gases pass out overhead through line 18 and are vented to the atmosphere. The water containing the fine catalyst particles in suspension is withdrawn from the bottom of the scrubber 16 through line 19 and pumped into rotary filter 20. In this filter the bulk of the water is separated from the catalyst and recycled to the scrubbing tower 16 through line 21 by means of pump 22. Makeup water as needed may be added through line 23. The addition of this makeup water may be controlled automatically through valve 24 by means of level control 25.

The filter cake consisting of the separated catalyst is discharged from rotary filter 20 into screw conveyor 26 which feeds directly into regenerator 2 at a point 27 below the dense phase level 4. The discharge of the catalyst from conveyor 26 may be facilitated by the introduction of steam or air into the discharge end of the conveyor through line 28.

Figure 2:
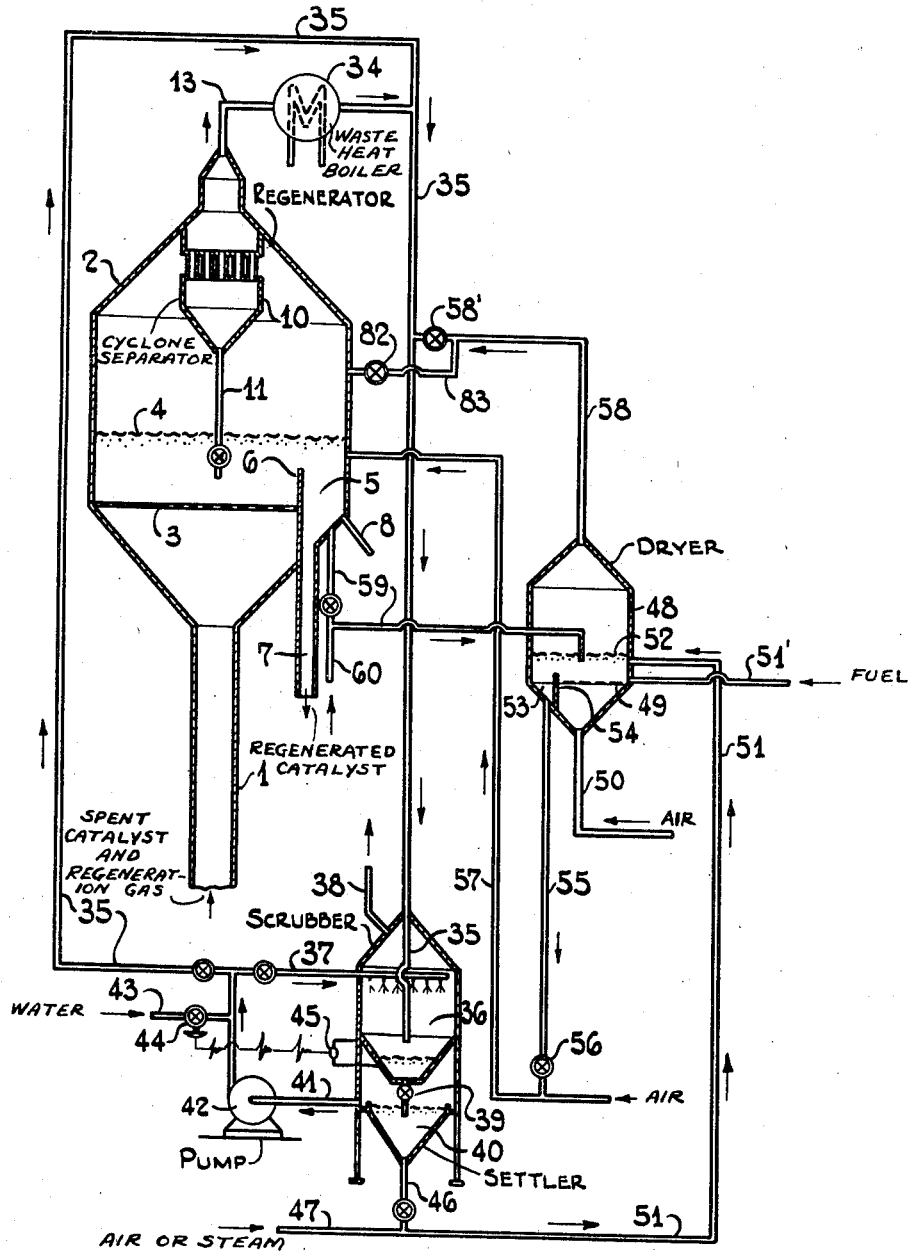
Fig. 2 is an alternative embodiment of the invention in which the slurry is dried as a fluidized mass in a hindered settler.

Referring now to Fig. 2, there is shown another embodiment of this invention in which the catalyst is substantially completely dried under conditions similar to those existing in the regenerator. According to this embodiment, flue gases from regenerator 2 are cooled by passing through line 13 into waste-heat boiler 34, quenched by a stream of water flowing from line 35, and passed to scrubber 36. In scrubber 36 the gases containing the catalyst fines are scrubbed with a spray of water introduced through line 37. The water scrubs out practically all the fine particles contained in the gas. The scrubbed gases pass out overhead through line 38 and are vented to the atmosphere. The water containing the fine catalyst particles in suspension is withdrawn from the bottom of the scrubber 36 through line 39 into thickener 40. In thickener 40 the catalyst particles settle to the bottom as a sludge having a concentration of about 1 lb./gal. leaving a layer of water above, which is recycled through line 41 and pump 42 partly to line 35 for use in quenching the gases from line 13 and partly to line 37 for scrubbing the gases in scrubber 36. Makeup water as needed may be added through line 43. The addition of this makeup water may be controlled automatically through valve 44 by means of level control 45. The thick slurry or sludge is removed from the bottom of thickener 40 through line 46 and is picked up by a stream of steam or air flowing in line 47 and is conveyed to a dryer 48 where it is introduced just above a grid 49 arranged in the bottom portion of the dryer. Simultaneously air at low pressure is introduced into the bottom of the dryer through line 50. This dryer is similar in construction to regenerator 2 and is of the type known generally as a hindered settler. The dryer is maintained at about 800° F. by burning oil introduced through line 51'. At this temperature the water contained in the wet sludge is quickly flashed into steam, so that only a solid and a gaseous phase are maintained therein. The velocity of the gases flowing through the dryer is maintained at about 1½ ft. per sec. so that the body of catalyst in the dryer is maintained as a relatively dense fluidized mass having a level 52. The density of the catalyst below this level is about 10 to 30 lbs. per cu. ft. The space above the level 52 has a much lower concentration of catalyst than the dense fluidized mass having the level 52. In the dryer the catalyst is maintained in a turbulent condition so that the temperature throughout the mass is substantially uniform and the drying is thereby facilitated.

Within the bottom portion of the dryer 48 is a well 53 similar to the well 5 of regenerator 2. This well extends slightly above grid 49 as indicated at 54. Dry catalyst is withdrawn as a relatively dense fluidized mass from the bottom portion of dryer 48 through aerated standpipe 55 having a valve 56 and conveyed by a stream of air or steam through line 57 into the well 5 of regenerator 2. Standpipe 55 is of such a height that the pressure at the valve 56 is sufficient to prevent the air flowing through line 57 from passing up standpipe 55 and to aid in conveying the dry particles to regenerator 2 as a result of the decrease in density of the fluidized mass by the addition of air. Gases and steam leave the dryer 48 through line 58 and are introduced through valve 58' into line 35 through which they are conveyed to scrubber 36. If desired, the air introduced through line 50 may be used to entrain all of the dried particles and carry them overhead, in which case valves 56 and 58' are closed and valve 82 is opened so that the suspension of catalyst in air is introduced directly into regenerator 2 through line 83.

At the beginning of the operation it is necessary to add catalyst to the dryer from the dense phase in regenerator 2 by means of line 59. This catalyst is conveyed to the dryer by the addition of air from line 60.

Figure 3:
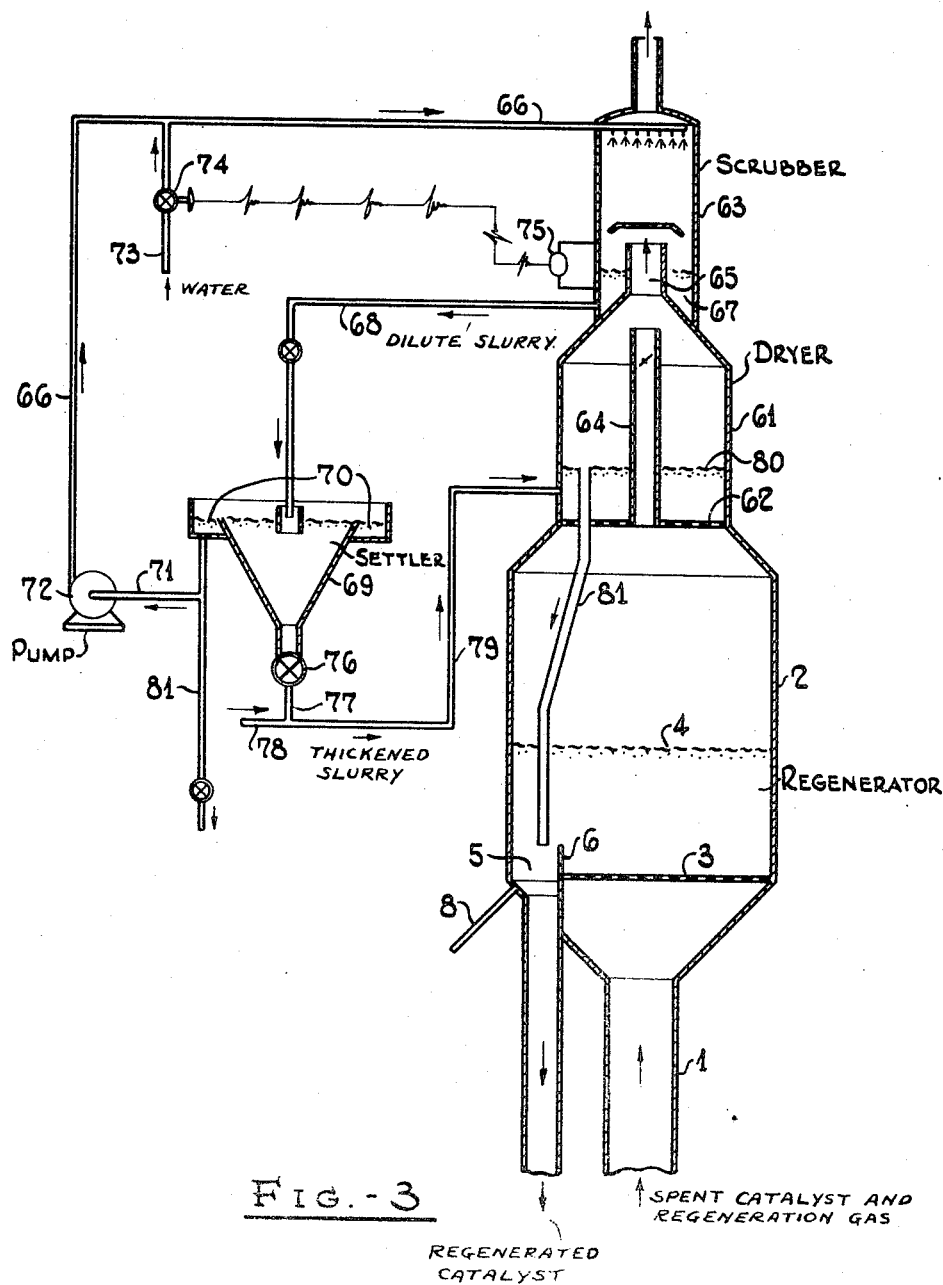
Fig. 3 illustrates still another embodiment in which the slurry is dried in a hindered settler type of drier heated by the flue gases from the regenerator.

Referring now to Fig. 3 there is illustrated a third embodiment of this invention in which the hindered settler dryer is placed on top of the regenerator and the scrubber on top of the dryer. According to this embodiment the dryer comprises a secondary section 61 of regenerator 2 mounted on top thereof separated from the lower portion of the regenerator 2 by means of grid 62. Above the dryer 61 is mounted scrubber 63. The flue gases leaving the main part of the regenerator at a temperature of about 1000-1200° F. pass through the grid 62 into the dryer 61 and thence through line 65 into scrubber 63. If desired these gases may be passed through separating means, such as a cyclone separator to remove any entrained solid particles.

Instead of passing through the grid 62, a portion of the gases may pass through pipe 64 and directly into the scrubber 63 through line 65. The flue gases passing through line 65 still contain catalyst fines from the disengaging section of regenerator 2 above level 4. In scrubber 63, these gases are met by a spray of water introduced through line 66 which effectively scrubs substantially all of the catalyst fines from the flue gases, forming a slurry 67 in the bottom of scrubber 63, having a concentration of about one lb. of catalyst per gallon of water. This slurry is withdrawn from scrubber 63 through line 68 and introduced into settler 69 where the slurry settles into a concentrated slurry surmounted by a layer of clear water which overflows into trough 70. This clarified water is recycled to the scrubber 63 through line 71, pump 72 and line 66. Makeup water may be added through line 73 which may be controlled automatically through valve 74 by means of level control 75 in scrubber 63. A portion of the water may be withdrawn from the system through line 81, if desired.

Returning now to settler 69, concentrated slurry having a concentration of about 5 lbs. of catalyst per gallon of water is removed through valve 76 and line 77 and introduced into a stream of air or steam flowing in line 78 which conveys it through line 79 to dryer 61. In dryer 61 the thickened slurry or sludge is met by the hot gases emerging from regenerator 2 through grid 62. Since these gases are at a temperature of 1000-1200° F., the water in the slurry is immediately flashed into vapor leaving a dry catalyst which forms a dense phase having a level 80 in the dryer 61. This dense phase overflows into line 81 and is returned to the dense phase having level 4 in regenerator 2. The flue gases passing through grid 62 should have a velocity between 0.5 and 1.5 ft. per sec. so as to maintain the dense phase having the level 80.

Although the present invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed. For example the settling chambers 40 and 69 of Figs. 2 and 3 respectively may be placed above the regenerator 2 so that the concentrated slurry may flow into regenerator 2 by gravity.

The nature and objects of the present invention having thus been set forth and specific embodiments of the same given, what is claimed as new and useful and desired to be secured by Letters Patent is:

1. In the regeneration of spent catalyst, the method of separating regenerated catalyst from regenerating gases which comprises maintaining a dense fluidized mass of catalyst in a regeneration zone, withdrawing the bulk of the regenerated catalyst particles directly from the dense fluidized mass in the regeneration zone, passing the regeneration gases through a first separating zone wherein most of the catalyst particles are removed, then passing the gases containing entrained catalyst fines into the lower portion of a second separation zone, introducing a spray of water into the said second separation zone to remove substantially all of the catalyst fines from the gases and to form a suspension of catalyst particles in water, passing the suspension of catalyst particles in water to a settling zone to form a concentrated slurry of catalyst in water as a bottom layer, suspending said concentrated slurry in a gaseous medium and conveying said concentrated slurry to a drying zone in said gaseous medium, passing a hot gas upwardly through said drying zone to maintain the catalyst particles as a substantially dry dense fluidized mass having a level and thereby substantially drying said concentrated slurry in said drying zone, removing substantially dry catalyst directly from the dense fluidized mass in said drying zone, and recycling said substantially dry catalyst to the dense fluidized mass in said regeneration zone.

2. A method of regenerating powdered catalyst containing carbonaceous deposits which comprises mixing the catalyst particles with a gas containing free oxygen in a regeneration zone to burn off the carbonaceous deposits from the catalyst particles, separating regenerated catalyst particles from the regenerating gases in a dry separation step, then cooling such gases and scrubbing such gases in another separating zone with water to remove substantially all of the catalyst particles from the regenerating gases and to form a slurry of said catalyst particles in water, settling said slurry, removing the excess water from said slurry, suspending the resulting concentrated slurry in a gaseous medium and conveying said concentrated slurry to a drying zone, substantially drying said concentrated slurry in said drying zone at a temperature of about 800° F. by passing a hot gas upwardly through said drying zone to maintain the catalyst particles as a substantially dry dense fluidized mass having a level, removing substantially dry catalyst from the bottom portion of the fluidized mass in said drying zone, and conveying said substantially dry catalyst into the fluidized mass in said regeneration zone.

3. In the recovery of powdered catalyst from regeneration gases, the step which comprises maintaining a dense fluidized mass of catalyst in a regeneration zone, separating the bulk of the catalyst from the regeneration gases by removing the catalyst as a relatively dense fluidized mass from the lower portion of a regeneration zone, removing regeneration gases containing catalyst particles from the regeneration zone, scrubbing the gases with water to separate all of the catalyst particles contained therein and form a slurry of catalyst particles in water, settling the slurry, removing excess water from said slurry, suspending the resulting concentrated slurry in a gaseous medium and conveying said concentrated slurry to a drying zone, substantially drying said concentrated slurry as a fluidized mass in said drying zone by passing a hot gas upwardly through said drying zone to maintain the catalyst particles as a substantially dry dense fluidized mass having a level, removing substantially dry catalyst as a dense fluidized mass from the bottom portion of said drying zone and returning said substantially dry catalyst to the fluidized mass in said regeneration zone.

HOMER Z. MARTIN.

REFERENCES CITED

The following references are of record in the file of this patent:

UNITED STATES PATENTS

| Number | Name | Date |
| --- | --- | --- |
| 2,303,680 | Brueckman | Dec. 1, 1942 |
| 2,311,978 | Conn | Feb. 23, 1943 |
| 2,320,562 | Bransky | June 1, 1943 |
| 2,322,075 | Tyson | June 15, 1943 |
| 2,327,175 | Conn | Aug. 17, 1943 |
| 2,367,694 | Snuggs | Jan. 23, 1945 |
| 2,431,455 | Blanding | Nov. 25, 1947 |
| 2,431,630 | Arveson | Nov. 25, 1947 |